N. H. WENER.
MEASURING INSTRUMENT.
APPLICATION FILED JAN. 22, 1912.
1,063,091. Patented May 27, 1913.
2 SHEETS—SHEET 1.
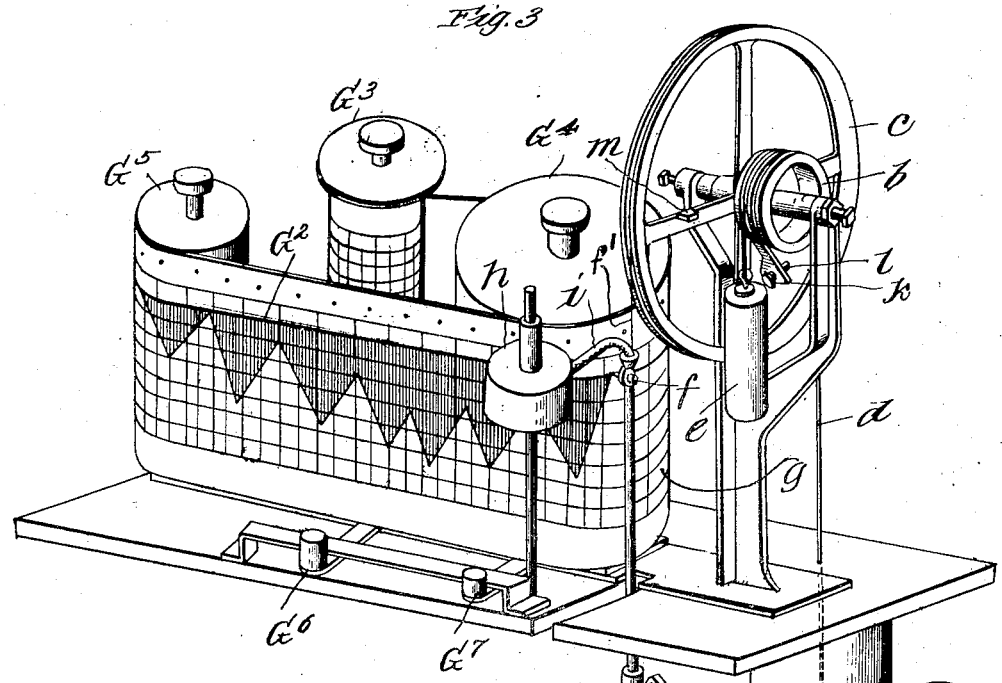
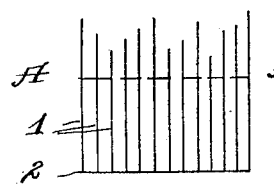
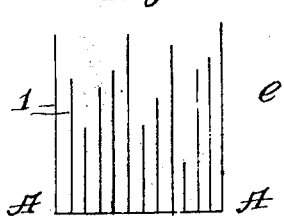
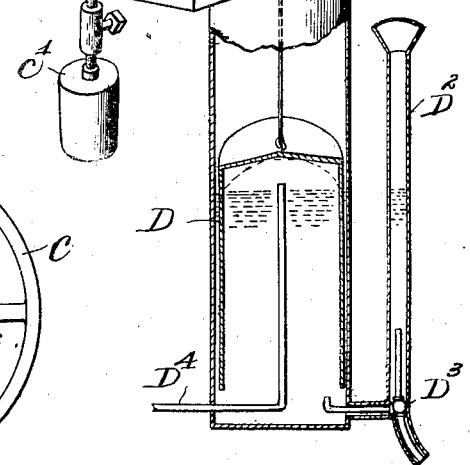
WITNESSES
INVENTOR,
Nils Harald Wener,
Knight Bro. Attorneys.

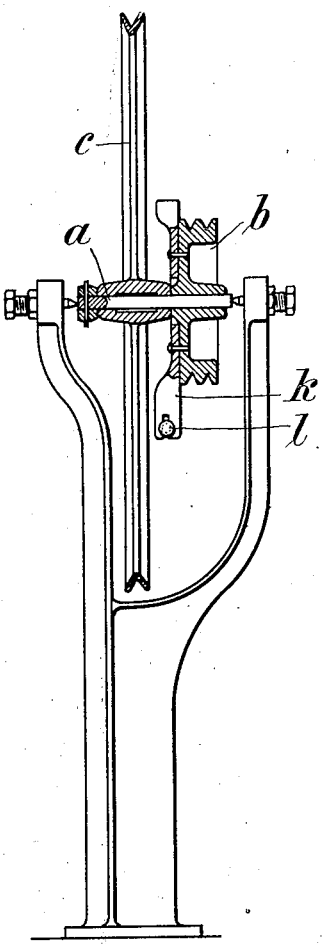

UNITED STATES PATENT OFFICE.

NILS HARALD WENER, OF STOCKHOLM, SWEDEN, ASSIGNOR TO AKTIEBOLAGET INGENIORSFIRMA FRITZ EGNELL, OF STOCKHOLM, SWEDEN.

MEASURING INSTRUMENT.

1,063,091.  Specification of Letters Patent.  Patented May 27, 1913.

Application filed January 22, 1912. Serial No. 672,750.

*To all whom it may concern:*

Be it known that I, NILS HARALD WENER, a subject of the King of Sweden, and a citizen of Sweden, residing at 20 Norra Bantorget, Stockholm, Kingdom of Sweden, have invented certain new and useful Improvements in Measuring Instruments, of which the following is a specification.

The present invention relates to measuring instruments and especially recording and registering instruments of that kind in which an organ moves a longer or shorter distance, which distance has to be measured. In recording and registering instruments hitherto used the whole movement of said organ has been registered. In such instruments however, the disadvantage arose, that the different lines on the registering paper would obtain about the same length, which caused great difficulties in observing the different lengths of the lines especially if the successive strokes of the organ were nearly of the same length. According to the present invention this disadvantage will be overcome by using only the last part of the movement of said organ for moving the writing pen or index. In order to accentuate more strongly the difference in the movements, these last movements are multiplied by a suitable gearing at a ratio for instance of 1 to 3. The difference in length of the individual lines will therefore obviously be threefold increased.

The particular embodiment selected for illustration of the invention is designated upon the basis of a recording machine, producing an inscription, from which can be read at any time, the positions assumed by the indicator during any measured interval of time. But the position of the indicator relatively to a surface graduated both as to the unit of measurement, and time is nevertheless observable at all times, so that the measuring mechanism thus becomes a register as well as a recorder.

The invention is illustrated on the accompanying drawings where—

Figure 1 shows a diagram made by an ordinary instrument; Fig. 2 a diagram made by an instrument in accordance with the present invention; Fig. 3 is a perspective view of an apparatus representing one embodiment of the present invention; and Fig. 4 a side elevation partly in section thereof, and Fig. 5 a detail view of the indicator pulley.

Fig. 1 shows a part of a diagram produced by means of the ordinary devices.

1 designates the whole length of the registering line drawn out from line 2.

Fig. 2 shows a diagram produced according to the present invention. Only the upper parts lying above the line A—A of the lines 1 in Fig. 1 have been registered, these parts being for instance threefold lengthened, so that also the difference between the different lines is threefold increased. Obviously a much closer observation may thereby be carried out.

The apparatus shown in Figs. 3 and 4 will now be described. On the shaft $a$ are arranged two pulleys $b$ and $c$. The former one is made as a double disk, carrying on the one side the bell D hanging from the rope $d$, in which bell for instance the volume of gas has to be measured, and on the other side of the pulley is suspended the counterweight $e$. The pulley $c$ is not attached to the shaft $a$ but can turn around said shaft and is for instance of a diameter thrice as large as that of the pulley $b$. The pulley $c$ carries the writing pen $f$ suspended from its periphery on a line $f^1$ coöperating on its vertical reciprocating movement with the diagram $g$. $h$ designates a stationary inkholder with the feeding tube $i$ with which the pen $f$ contacts when in its upper or stationary position. The base line $G^2$ of the record on the diagram paper corresponds to line A—A Fig. 2, to which the pen or index $f$ always returns after each stroke. This diagram paper is ruled in the usual manner for reading off from the base line. The unused paper is inserted as a roll at $G^3$, from there the end of the paper is taken around the drum $G^4$ and fastened to the roll $G^5$ on which the diagram is wound up. The drum $G^4$ is continuously driven by a clockwork, thereby transferring the paper from the roll $G^3$ to the roll $G^5$. The clockwork is wound up by means of winding key $G^6$ and started or stopped by lever $G^7$. The pulley $c$ is balanced in the position shown in Fig. 3 by means of the reinforcement $c^2$ and a small weight $e^1$, the latter being suspended from the end of line $f^1$ for the pen. The pulley $b$ is provided with an arm $k$ having a set screw $l$ and the pulley $c$ is provided with a projection *m* lying in the path of the set screw, see particularly Fig. 5. It is obvious that the pulley *b* by this arrangement can turn, the pulley *c*, however, remaining still until the set screw *l* strikes against the projection *m*, the pulley *c* being thereby also rotated. By this means a dead course of the bell will be effected, and this first movement of the bell, which actuates the pulley *b* is consequently not recorded. This dead movement corresponds to the parts of the registering lines lying between the lines 2 and A—A in Fig. 1. Only when the screw *l* strikes against the projection *m* will the pulley *c*, and with it the pen *f* be moved, said movement of the pen being thrice as great as the last part of the motion of the bell, as shown in Fig. 2. Fig 1 may be considered as a diagram of the whole motion of the driving bell and Fig. 2 as a diagram of the motion of the writing pen.

The driving bell D is of the usual construction and provided with a water seal. The water is filled in through the funnel $D^2$, communicating with the bottom of the bell housing. A three-way cock $D^3$ is supplied near this bottom, through which the water may be filled in or drained off. The gas to be tested enters and leaves the bell through the pipe $D^4$, at certain intervals regulated by hand or automatically. Obviously the bell may be replaced by any other measuring body for instance a column of liquid, a float or the like, as the device may be used for all kinds of measuring instruments, but especially for recording measuring instruments.

The device is used to great advantage in apparatus for self-registering of the percentage of carbon anhydrid in combustion gases, as in such measuring instruments a comparatively great volume of the gas to be tested has to be measured, the movement of a measuring body such for instance as the bell described above, being thereby recorded several times enlarged. If this movement were registered in its entire length the travel of the writing pen would be very great. The whole registering device then would occupy a great deal of space. An additional advantage is that more precise readings may be obtained with my measuring instrument on account of the increase of the difference between the recording lines of the diagram.

Having fully described my invention, what I claim and desire to protect by Letters Patent is:—

1. Recording mechanism consisting of a movable measuring body, a movable recording organ actuated by the measuring body through the intermediary of a transmission giving the said organ a greater motion than the corresponding movement of the measuring body, said transmission transferring the motion of the measuring body to the recording organ after said body has moved a predetermined distance uniform for every operation.

2. Recording mechanism consisting of a movable measuring body, an arm connected therewith, a projecting member coöperating with said arm after said measuring body has moved a predetermined distance and a recording organ connected with said projecting member in such a way as to be given a greater motion than that of the projecting member.

3. Recording instrument consisting of a movable measuring body suspended from a pulley, an arm connected to said pulley, a second pulley mounted coaxially with said first pulley, a projection on the second pulley, said arm coöperating on the rotation of the first pulley with said projection, said second pulley bearing the recording organ and being of a greater diameter than the first pulley.

4. Recording instrument consisting of a movable measuring body suspended from a pulley, an arm connected to said pulley, a second pulley mounted coaxially with said first pulley, a projection on the second pulley, said arm coöperating on the rotation of the first named pulley with said projection, said second pulley bearing the recording organ and being of a greater diameter than the first pulley, a set screw for adjusting the relative positions of said arm and said projection.

5. Recording instrument for measuring volumes comprising a movable measuring body, a balancing weight, a pulley from which said measuring body and said weight are suspended to balance each other, a second pulley balanced in a certain position, a common axis for both pulleys, a recording pen suspended from said second pulley and a diagram table adjacent to said pen, a set screw in the first named pulley, a projection on said second pulley located in the circular path of said set screw and at a distance from the starting point of the set screw; the length of the radius at which the pen is suspended from the second pulley being a multiple of the length of the radius at which the said measuring body is suspended from the first pulley whereby the recorded length of travel of said measuring body will be multiplied on the diagram table.

6. Recording instrument for measuring volumes comprising a movable measuring body, a pulley from which said measuring body is suspended, said measuring body being balanced on said pulley, a recording means suspended from an arm revoluble about the same axis as said pulley and at a distance from said axis which is a multiple of the length of the radius of suspension of said measuring body, means for retaining said arm with the recording means in a zero position, a projection on said pulley and an abutment on said arm adapted to contact with said projection after a certain length of travel thereon, and partaking of the last part of the movement of said projection during the movement of said measuring body; whereby a magnified record of the last part of the travel of said measuring body will be marked by said recording means.

In testimony whereof I have affixed my signature in presence of two witnesses.

NILS HARALD WENER.

Witnesses:
GRACE PRICE,
HARRY ALBIHN.